United States Patent
Obrador et al.

[11] Patent Number: 6,137,589
[45] Date of Patent: Oct. 24, 2000

[54] EFFICIENT STORAGE OF DITHERED RASTER IMAGE DATA IN A PRINTER OR THE LIKE

[75] Inventors: Pere Obrador; Jordi Gonzalez, both of Barcelona, Spain; Jae Noh, Berkeley, Calif.

[73] Assignee: Hewlett-Packard Company, Palo Alto, Calif.

[21] Appl. No.: 09/137,714

[22] Filed: Aug. 21, 1998

Related U.S. Application Data

[63] Continuation-in-part of application No. 08/530,854, Sep. 20, 1995, Pat. No. 5,917,952.

[51] Int. Cl.[7] .............................. B41B 15/00; B41J 15/00; G06F 15/00
[52] U.S. Cl. ...................... 358/1.16; 382/245; 358/457
[58] Field of Search .................... 358/534, 535, 358/536, 539, 261.1, 261.3, 429, 455, 456, 457, 1.9, 1.15, 1.16, 1.1; 382/232, 237, 244, 245, 246

[56] References Cited

U.S. PATENT DOCUMENTS

| | | | |
|---|---|---|---|
| 4,475,127 | 10/1984 | Iinuma | 358/429 |
| 4,760,460 | 7/1988 | Shimotohno | 358/261.2 |
| 4,999,629 | 3/1991 | Katsuta | 341/155 |
| 5,218,382 | 6/1993 | Doggett | 346/155 |
| 5,237,346 | 8/1993 | Da Costa et al. | 346/155 |
| 5,239,625 | 8/1993 | Bogart et al. | 395/128 |
| 5,479,587 | 12/1995 | Campbell et al. | 395/116 |
| 5,485,568 | 1/1996 | Venable et al. | 395/155 |
| 5,574,485 | 11/1996 | Anderson et al. | 347/27 |
| 5,666,543 | 9/1997 | Gartland | 395/788 |
| 5,680,129 | 10/1997 | Weinberger et al. | 341/105 |
| 5,917,952 | 6/1999 | Noh | 382/239 |
| 5,960,116 | 9/1999 | Kajiwara | 382/238 |

*Primary Examiner*—Amelia Au
*Assistant Examiner*—Timothy M. Johnson

[57] ABSTRACT

Already stored uncompressed raster data are selectively compressed before any new raster data can be processed and stored. Both compressed and uncompressed raster data is preferably stored in the same size blocks, and the Raster Objects are preferably divided at Render Swath boundaries. Assuming that the Raster Object data has been or will be compressed by means of a known dither matrix, that dither matrix is used in the compression process to eliminate all but the data essential to reconstruct the dithered image, and the pixels of the original image are preferably successively processed along a predetermined scan path and the resultant linear pixel array is divided into successive runs which may each be encoded such that when those encoded runs are assembled into a replica of the original image and both the original image and the replica image are dithered with the same predetermined dither matrix, the dithered replica image is identical to the dithered original image. The dither-matrix based compression of the raster data is preferably followed by Golomb Rice compression.

29 Claims, 11 Drawing Sheets

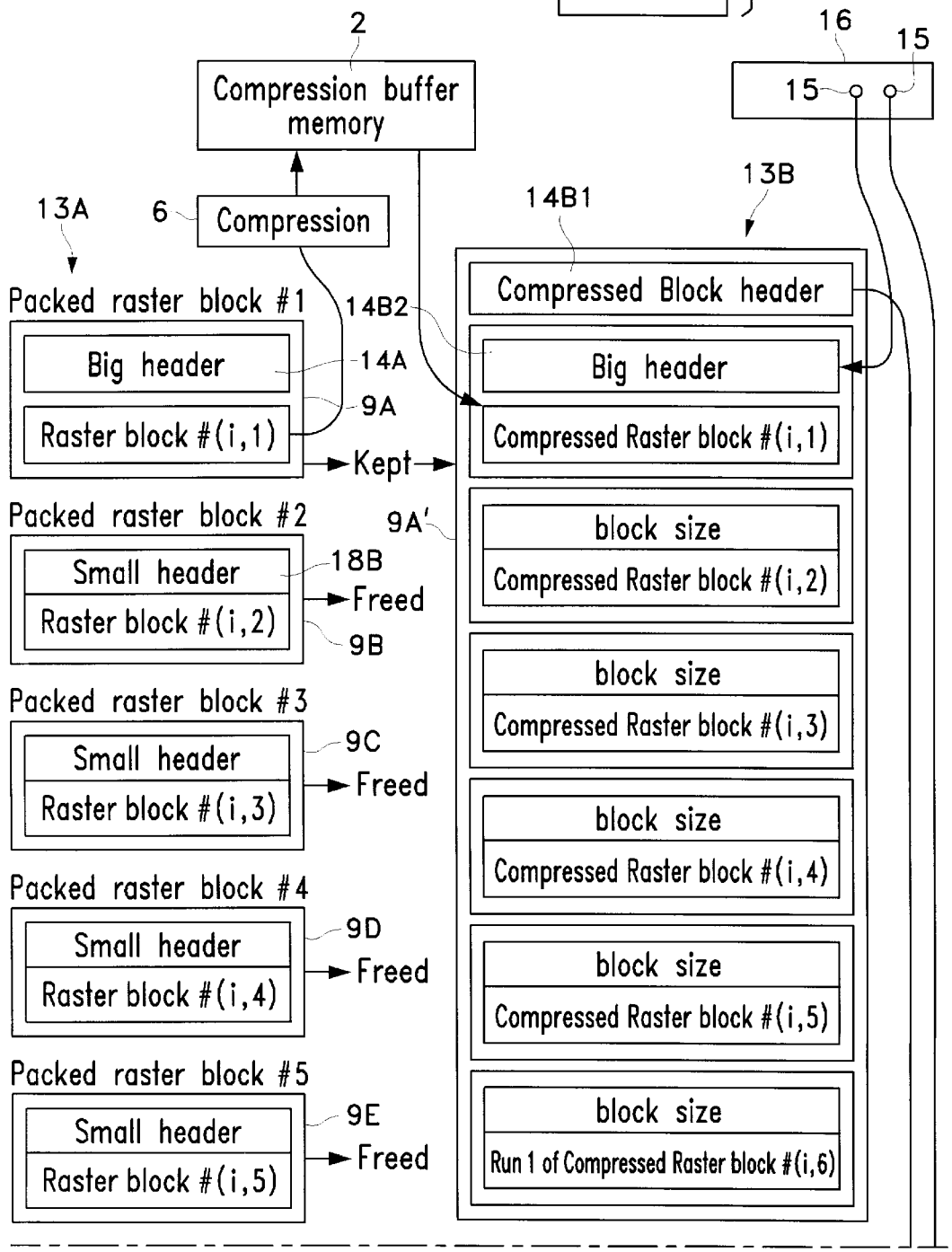

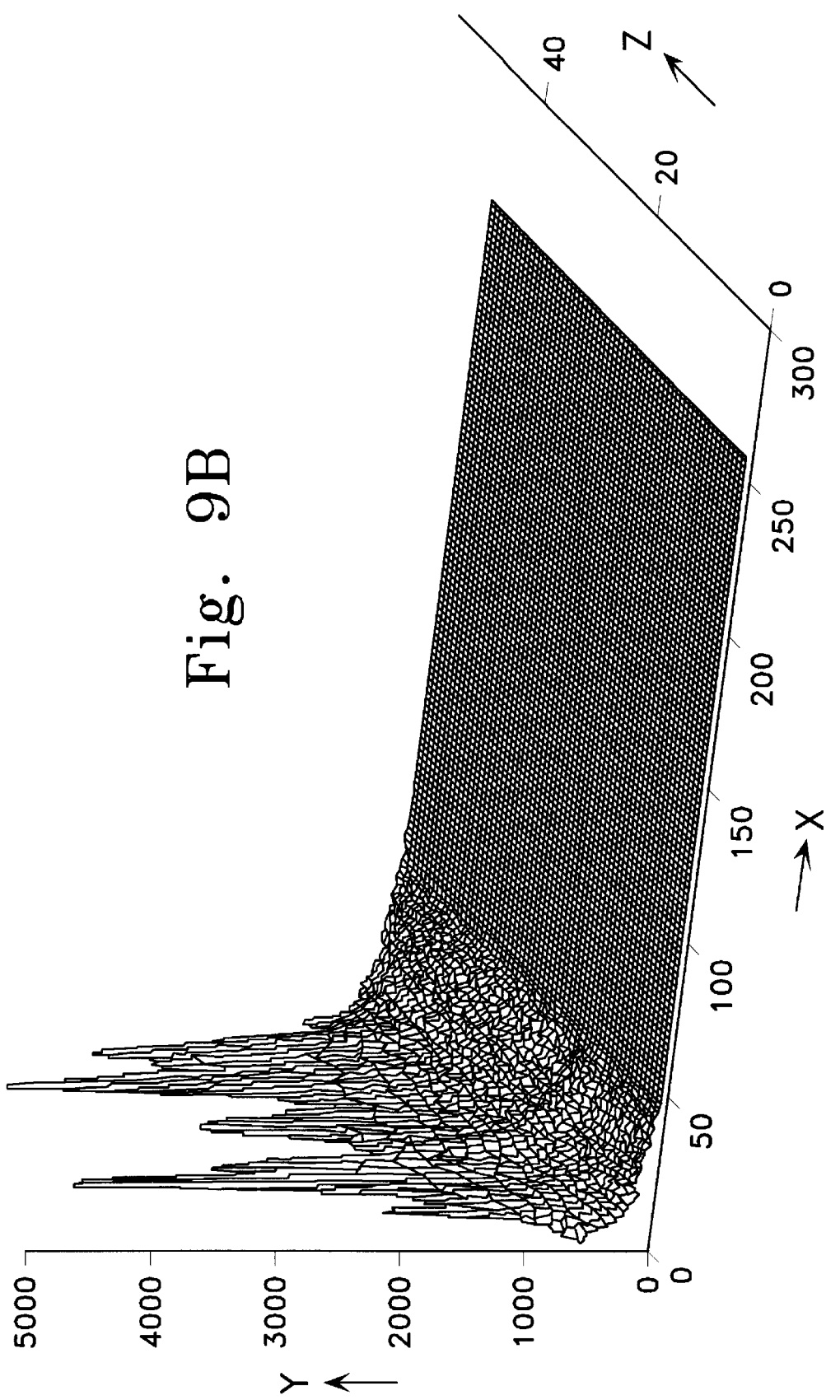

EFFICIENT STORAGE OF DITHERED RASTER IMAGE DATA IN A PRINTER OR THE LIKE

RELATED APPLICATIONS

This application is a continuation-in-part of unpublished U.S. patent application Ser. No. 08/530,854 filed Sep. 20, 1995, U.S. Pat. No. 5,917,952, which is hereby incorporated by reference.

BACKGROUND

A dither matrix may be used to convert continuous tone image data (or digitized pixel data having many discrete gray levels—typically 8 bits or 256 levels) to binary raster data (or pixel data having only a few gray levels—typically not more than 2 bits or 4 levels). The dithering process may be implemented in either hardware or software, and by a driver in a computer or by an image preprocessor in a printer, a display monitor, or other pixel oriented peripheral output device. The resultant binary raster data defines the individual pixels of a dithered image which includes both low frequency image content and high frequency noise. Typically, the binary raster data is temporarily stored in an associated memory until it has been combined with other data and the combined data representing an entire page of data (or a designated portion of a page, such as the "swath" printed during a single sweep of an inkjet "pen") has been "rendered" into an format suitable for printing (or other graphics-based output intelligible to a human user). In general, a simple run-length encoding (RLE) compression provides only a minimal level of compression for the data defining such a dithered image.

In many known image rendering processes, the organization and storage of the image data is page oriented and is based on contiguous memory allocation units, each having a fixed size. In order to avoid fragmentation and associated overhead, deletion of already printed data within a particular memory allocation unit, or even deletion of all the data associated with an entire memory allocation unit, typically does not free any storage space for other data until an entire page has been printed and all of the contiguous memory allocation units can be released.

SUMMARY

In a preferred embodiment, depending on the amount of memory then available in the output device (including both volatile memory such as RAM and non-volatile memory such as a hard drive), a memory management routine determines whether some or all of already stored uncompressed raster data needs to be compressed before any new raster data can be processed and stored. The new raster data also may be compressed "on the fly" before it is stored, but is preferably stored in uncompressed form (which requires only minimal processing time) and is subsequently compressed (which requires substantial processing time) only when additional memory is required, thereby maximizing throughput when not all raster data must be compressed.

The image data typically comprises more than one "Raster Block" (a 2-dimensional array having several rows of pixels). Assuming that compression is required, a compression routine compresses the raster data one block at a time, until the available memory is sufficient to store all the image data required to render at least a single "swath", and preferably an entire page.

Compressing the raster data only when required improves the throughput if only a limited amount of raster data is being printed and/or if the printer has been upgraded to include additional RAM or other memory (such as a local hard drive). Such an adaptive compression scheme also allows the same software to adapt to various types of input data having different information content and different storage requirements.

Prior to rendering and printing, the raster data are preferably stored in a Display List as Raster Objects having a size and structure that facilitates subsequent compression and retrieval, and that permits efficient re-use of the memory that becomes available when a previously stored Raster Object is compressed and/or is no longer required. For example, the Raster Objects may be blocks having a height of 8 ($=2^3$) pixels. This allows the compression algorithms to trace a path through the image data which is preferably of a two-dimensional zig-zag or peano configuration to take advantage of spatial correlations between adjacent rows as well as between adjacent pixels in the same row. At the same time, a relatively small Raster Object height (preferably a power of 2) for computational simplicity results in a smaller quantization of resources that is less wasteful when the image (or a selected portion of a larger image) is not an integral multiple of the Raster Object height, or when the data is received in bands which do not have the same height as the print swath, and advantageously allows memory to be released incrementally after each swath has been printed or even after each pass of a multiple pass print mode, thereby permitting raster data for a subsequent page to be downloaded even before a current page has been completely rendered and printed. A relatively small Raster Object size is also advantageous when the available memory is already fragmented, and large contiguous blocks of memory are not available. In addition to Raster Objects, the Display List will typically include other data types such as Vector Objects and Text Objects, which typically are stored in symbolic fashion independent of any swath boundaries with each stored symbol not being limited to a single swath, and which are combined in whole or in part with the Raster Objects in a particular print swath during the rendering process. The data compression aspects of the present invention are not specifically applicable to the such other data types. However, since a dither matrix typically has no effect on a monotone image such as black and white text or line art, the present invention may nevertheless find application to an already rendered bit-mapped image which includes both dithered continuous tone components derived from Raster Data and monotone text or line art components derived from Text and Vector Data.

In accordance with another aspect of the present invention, both compressed and uncompressed raster data is preferably stored in the same size blocks, with pointers both to and from a linked list of Raster Objects, so that any no longer required storage may be re-utilized without fragmentation as soon as the data is compressed and/or rendered for printing. Moreover, the Raster Objects are preferably divided at Render Swath boundaries prior to compression, so that as soon as a particular Render Swath has been rendered, all the memory space required for storing the associated Raster Object data for that particular Render Swath can be released. To further improve memory utilization without adding further computational complexity, all the Raster Objects in the same Render Swath may then be stored in compressed form in one or more of the same blocks which were originally used to store those particular Raster Objects in uncompressed form and which now function as container blocks for the compressed data; if two or more container blocks are required to store the compressed data corresponding to all the Raster Objects in the same Render Swath, those container blocks are linked (to facilitate their release once the data has been rendered) and the compressed Raster Object data is stored in linked fashion (to facilitate retrieval and uncompression of the data during the rendering process). Since the data is now compressed, only a fraction of the original blocks are utilized as container blocks and the remaining blocks are released as soon as the data is compressed. Depending on the particular application and amount of free memory, the blocks storing the data (compressed or uncompressed) required to render a particular Render Swath may be reallocated for other uses as soon as that Render Swath has been rendered; however when there is sufficient memory available, it is advantageous to save the compressed Raster Object data for possible use in preparing other Render Swaths, for example when printing a second copy of the same page or when reprinting the same page after a paper jam.

In accordance with another aspect of the invention, a lossless compression scheme is used which reduces the redundancy in the data stream to store to a minimal value which corresponds to the actual information content ("entropy") of the data. Assuming that the Raster Object data has been or will be compressed by means of a known dither matrix, that dither matrix is used in the compression process to eliminate all but the data essential to reconstruct the dithered image. In such a dither-matrix based compression process, the pixels of the original image are preferably successively processed along a predetermined scan path and the resultant linear pixel array is divided into successive runs which may each be encoded as a run length having an associated level function, such that when those encoded runs are assembled into a replica of the original image and both the original image and the replica image are dithered with the same predetermined dither matrix, the dithered replica image is identical to the dithered original image. If the level function is a constant value function, the level may be encoded directly as a numerical value, or indirectly by pointing to the cell of the predetermined dither matrix containing a threshold corresponding to the constant level with which that run is to be encoded. In either case the pixels in a particular run of the original image associated with respective dither matrix thresholds greater than the encoded value for that run will correspond to white pixels in the two dithered images (original and replica) and the pixels of that run having respective dither matrix threshold values less than the encoded value will correspond to black pixels in the two dithered images. Those skilled in the art will realize that the same dither-matrix based compression scheme can be used whether the raster data has already been dithered by means of a known dither matrix or is being processed in its original still undithered form, since (unlike error diffusion) there is no need to take into account any residual errors from previously processed pixels, each pixel of the dithered image can be simply and readily calculated "on the fly" from the corresponding pixel of the continuous tone image.

Moreover, the run length can be truncated so that it always terminates at a pixel whose associated dither matrix threshold corresponds to the level in question, in which case the encoded run length will itself serve as the pointer to the constant level for that run and there is no need to separately store any pointer or value, thereby making more efficient use of the available storage. However, that efficiency is at the expense of some duplicate processing, since once the maximum run length and a range of possible thresholds has been determined for a particular run, any pixels after the last pixel pointing to a permissible threshold will have to be processed a second time as the starting pixels of a new run. Accordingly, in a presently preferred embodiment, "Post Run" data may be appended to the truncated run length (the "Pre Run" data) to accommodate runs of greater length in a manner that no only is efficient of storage space, but also makes efficient use of computational resources. Although the number of bits required to encode the level is determined by the number of cells (unique threshold values) in the dither matrix, the run length is not so limited and in order to accommodate arbitrarily long runs, it is preferably encoded as a variable length field.

In an alternative embodiment, the encoding process encodes at least longer runs as two independent variables (level and run length), which permits greater processing flexibility, since exactly the same predetermined dither matrix need not be available both for compression and decompression.

In accordance with yet another aspect of the invention, the dither-matrix based compression of the raster data is preferably followed by Golomb Rice compression, which will further improve the compression rate by a factor of from 2 or 3 times for very complex images with lots of details, to more that 8 times for smooth images, and even more when using a scaling factor greater than one and/or a printer having a higher resolution than the original image.

The invention is particularly applicable to a high quality large format inkjet printer having 4 printheads each 512 dots high which are supported in a print carriage that traverses along a print swath that is 36 inches wide, in which case a single print swath may have as many as $3 \times 512 \times 36 \times 600 = 33,177,600$ dots, which means that as many as 4,147,200 bytes (before any compression) may have to be stored in the Print Swath memory. However some of the inventions's memory utilization aspects, whereby memory required for storing Objects in the Display List may be reallocated once those Objects are no longer required, may also be applicable when those Objects are Text Objects and/or Vector Objects, rather than Raster Objects.

DRAWINGS

FIGS. 9A and 9B are Golumb-Rice histograms of typical PreRun and PostRun run lengths through a single Raster Block.

DETAILED DESCRIPTION

Figure 1:
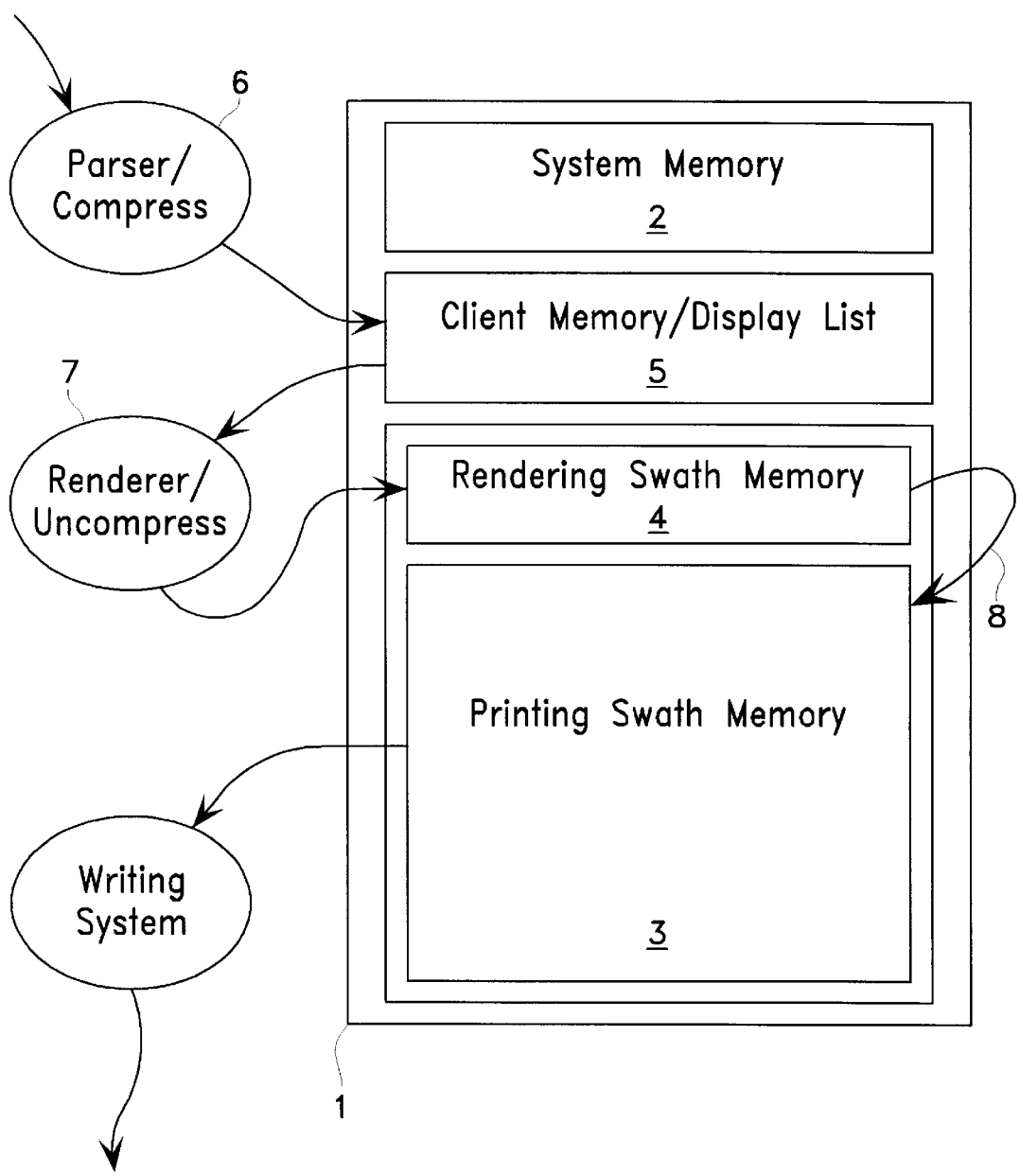
FIG. 1 is a memory map diagram for a printer with Raster Objects in a Display List being selectively compressed and uncompressed.

Referring now to FIG. 1, the random access memory ("RAM") 1 for a printer includes a System Memory 2 area for system variables, semaphores, I/O buffers, stacks and other temporary data used to implement the present invention (software routines and the like are preferably stored in Read Only Memory ("ROM"), as are various pre-defined graphical and textual symbols (such as lines, areas, shapes or characters)). The data may be represented by conventional languages such as HP-GL/2, and individual image elements may be relatively simple black and white image elements requiring only one shade of one color of ink or may be relatively complex full color image elements that involve millions of different combinations of at least three colors of ink. In an exemplary embodiment, the printer is a large format inkjet print with four separate ink cartridges for applying individual droplets of four different colors of ink (Yellow, Magenta, Cyan and Black) simultaneously to multiple rows of pixels in a "Print Swath" (the printable area defined by the multiple nozzles of the individual ink cartridges as those nozzles traverse across the print medium). In an exemplary high quality large format printer, the pixel spacing is 600 dots per inch, each cartridge has a nozzle plate with 512 nozzles arranged in a column to thereby print 512 individual pixel rows during a single traverse, and the print medium is 36" wide.

High quality Swath-oriented printing processes typically do not print an entire Print Swath in a single traverse, but rather apply an interlaced pattern of dots during multiple traverses, such that each Print Swath overlaps the prior traverse by a fraction of a single swath height. Preferably the ink is not simultaneously applied to two neighboring pixels during the same traverse, which means that at most only one fourth of the pixels (half the rows and half the columns) can be printed during a single traverse. Moreover, even if no more than two colors of ink are applied to the same pixel location, the two different colors of ink are preferably not applied to the same pixel during the same traverse. Accordingly, eight traverses across the same area may be used to print a high quality full color image, although in other print modes, fewer or more passes may be required. For example, in a draft mode in which the pixel spacing is greater than the diameter of a single dot of ink, then two adjacent columns can be printed in the same pass. On the other hand, if the minimum spacing for simultaneously printed pixels is increased from two to three, then at least nine (three times three) traverses will be required.

By including a Rendering Swath memory 3 in addition to the Printing Swath Memory 4, the printer software can be rendering the image data for the next Swath to be printed concurrently with the printing of the current Swath. Since each Print Swath is displaced only a predetermined fraction (for example one eighth) of the Print Swath height from one traverse to the next, only that predetermined fraction of the image data in the Swath Memory will have to be rendered before the next traverse can be begun. Accordingly, by merely providing a Rendering Swath Memory 3 with a capacity equal to only one eighth that of the Printing Swath Memory 4, the next traverse can be rendered while the current traverse is being printed, and the effective throughput is thereby doubled.

The Raster Objects are bit-mapped images and are typically received in a 1 row by 1 row basis in conventional fashion over a dedicated communication cable from an external printer driver routine or application program in an external host computer. Alternatively, the original image may be locally produced (for example, by means of a digital camera or document scanner). If the image is a continuous tone color image, each pixel is typically represented with a corresponding byte in each of three "planes" (one plane for each primary color); in the case of limited palette bit mapped line drawings and already dithered continuous tone color images, fewer bits per pixel are required (typically one or two bits per pixel per plane). "RTL" is the HP Raster Transfer Language used for transmitting printing Raster Images (i.e., images). It is usually used along with HP-GL/2 (i.e., vectors, lines, areas and fonts) in order to produce printed images.

Because the Raster Objects were not necessarily received in the order to be printed and typically would be combined with other separately received data (for example font-based text), it is conventional to "parse" the incoming data (identity its type and its location on the printed page and perform any required rotation or scaling) and store it in a "Display List" 5, before "rendering" all the received data for a single page (or Print Swath) into a composite bit-mapped image. The "rendering" process not only superimposes different objects located at the same physical location, but also typically involves conversion of the three primary color planes into corresponding planes for each ink (typically four, or even more for certain printing processes) and other image manipulation appropriate for a particular selection of inks and print medium. It is typically performed one pixel row at a time, but simultaneously on all planes.

Figure 5:
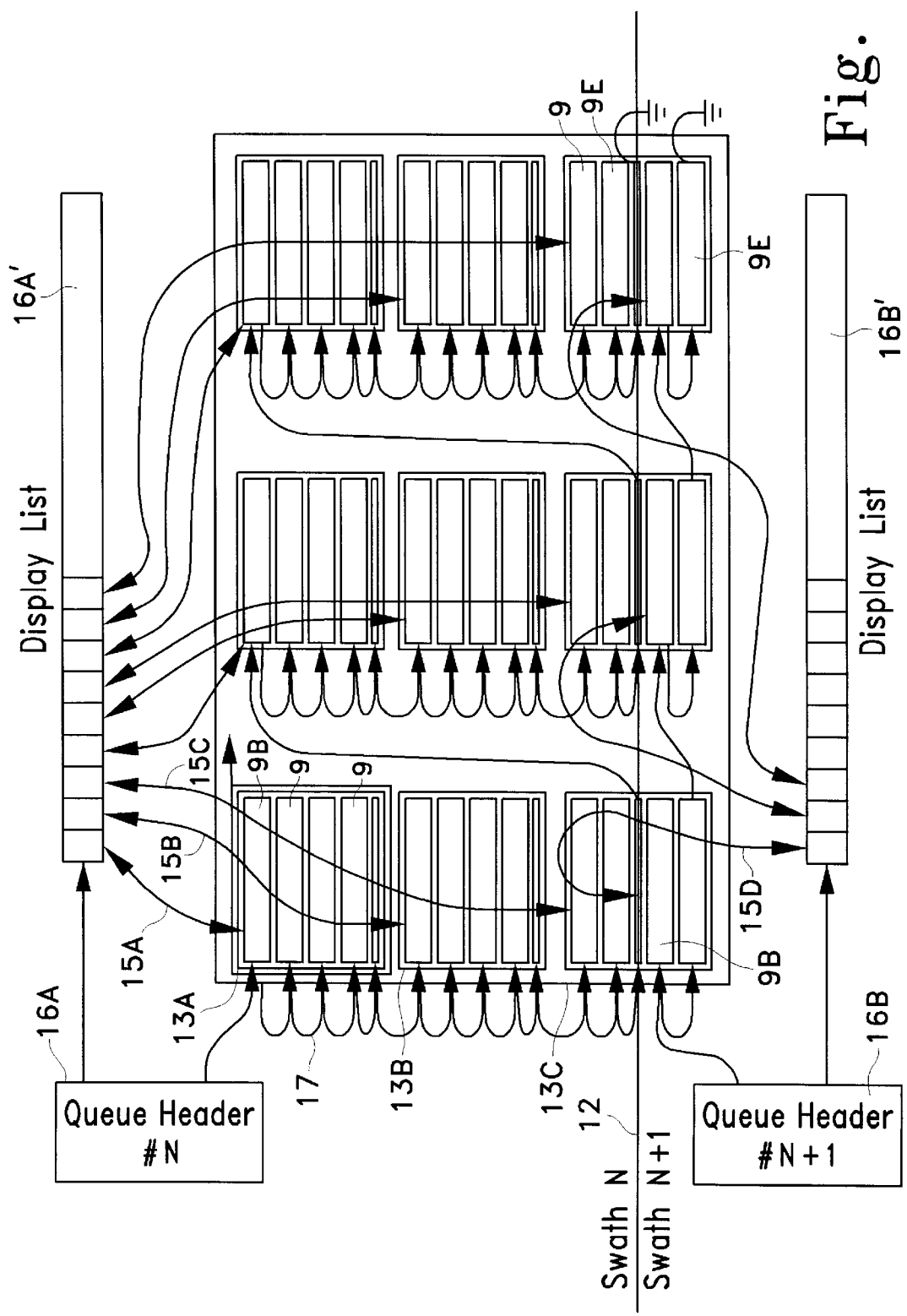
FIG. 5 shows Super Block data crossing a boundary between two successive Swaths.

In accordance with one important aspect of the present invention (and as described in more detail hereinafter with reference to FIGS. 5 & 6), at least the Raster Objects are not only Parsed before being stored in the Display List memory 5, but are also selectively Compressed (block 6) so that an entire Print Swath (or even an entire page) of data will fit into the available storage Display List memory 5 before it can be Uncompressed and Rendered (block 7) prior to storage in the Render Swath memory 3.

In an exemplary embodiment, the total memory available is 8 megabytes. The pen swaths are 512 dots high, and the maximum printable width is 36". Assuming a resolution of 600 dots per inch (dpi), a single Print Swath potentially could include 21600 columns of dots. When multiplied by the number of dots per column (512) and by 4 planes (KCMY), this adds up to 42,368,000 dots, or (8 bits/byte) 5.53 million bytes, which equates to 5.27 Megabytes for the Print Swath memory 4 plus an additional 0.66 Megabytes for the 64 row Rendering Swath memory 3. The system variables needed for the code to execute the printing pipeline in the System Memory occupy about 1.5 megabytes. Assuming that the raster data in the Print Swath memory 4 and the Rendering Swath memory 3 is not compressed, this may typically leave only about 500 kilobytes of RAM for the Display List memory 5, which typically is used to store not only the Raster Objects for the current page, but all other objects being printed on that page, such as vectors or/and text. In practice, other conventional means outside the scope of the present invention will probably be used if there is not otherwise sufficient memory available to store all the required data until it is rendered and printed, such as not storing any Data in the Display List memory 5 that is not required for the current print job (thereby reducing the required size of the Display List memory 5), and/or printing less than an entire Print Swath (thereby reducing the required size of the Print Swath memory 4 and of the Rendering Swath memory 3), and/or using relatively simple compression technology (such as run length encoding) to compress the rendered data in the Rendering Swath memory 3 on the fly before transferring that data (block 8) into the Print Swath memory 4 (thereby reducing the required size of the Print Swath memory 4).

Figure 2:
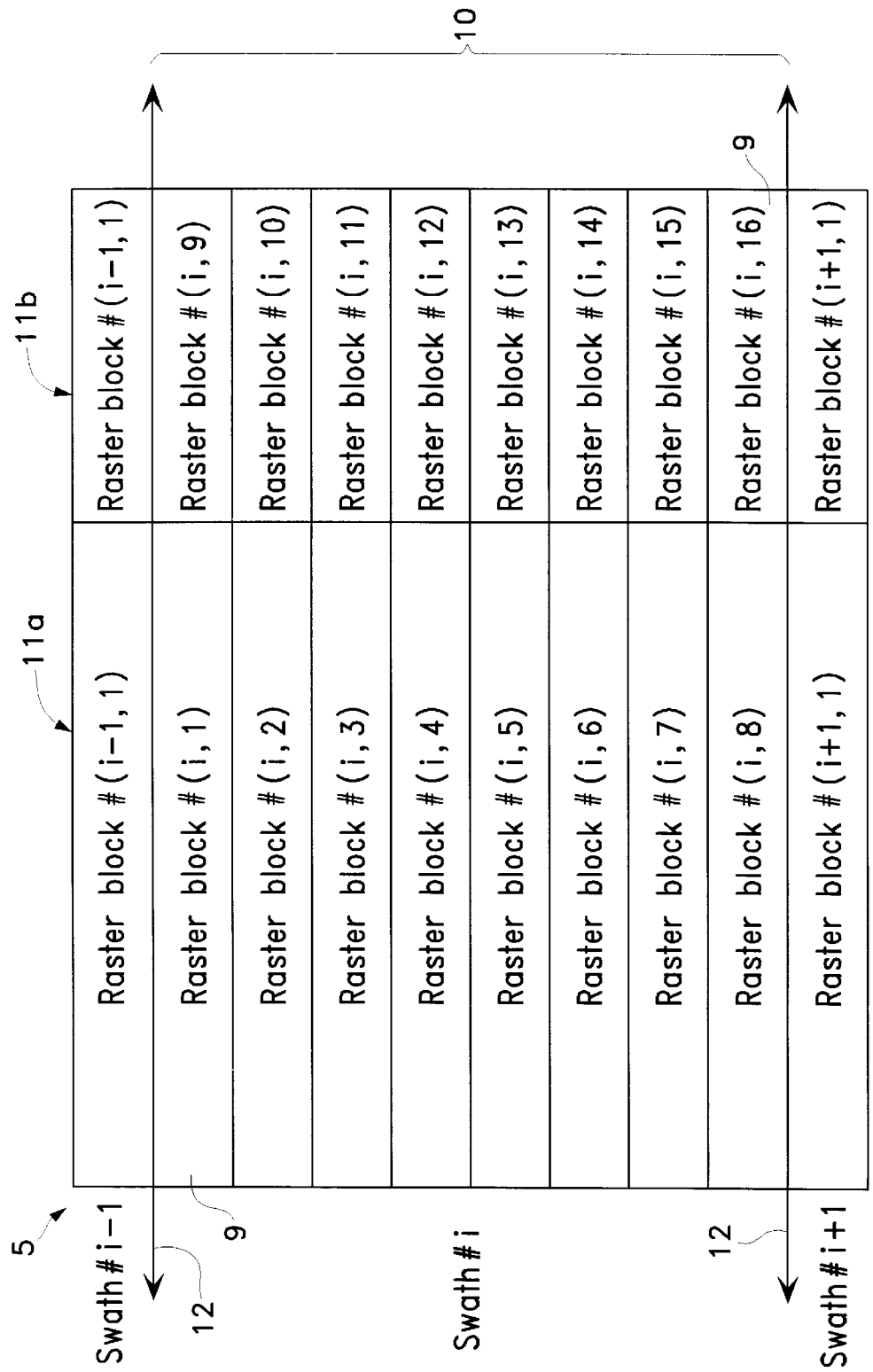
FIG. 2 shows a Raster Object crossing a Render Swath boundary decomposed into Raster Blocks, to facilitate reallocating memory space that is no longer required.

Reference should now be made to FIG. 2, which shows how the Display List memory 5 is preferably organized into Raster Blocks 9 (e.g., block $B_{i,1}$) each containing Raster Data that is fully contained within a single Render Swath 10 (e.g., swath $S_i$). If necessary, a single incoming Application Block 11a (for example, the received Raster Object data bounded by the calls: Image_raster_start and Image_raster_end) that crosses a Render Swath boundary 12 is parsed into more than one Raster Block (e.g., Raster Blocks $B_{i-1,8}$, $B_{i,1}$) of Render Swath data. Similarly, multiple Application Blocks 11a, 11b of incoming data that originate from a contiguous region of the original image corresponding to the same Render Swath may be combined. By this means, as each Swath 10 is rendered, the corresponding Raster Blocks 9 of the Display list 5 may be freed to accept other incoming data, thereby permitting overlap of the rendering (and possible compressing) 7 of Data for one page (or other printed unit such as a Print Swath) with the parsing (and possible uncompressing) 6 of data for the next printed unit. Organization into uniform sized Raster Blocks also facilitates allocation of available memory and minimizes the effects of memory fragmentation.

Depending on the free memory available in the host, the application will typically generate bigger or smaller Application Blocks 11. These are usually several bytes long, and a few rows high, and all the rows in this block are likely to share the same compression-oriented statistics (such as distribution of intensities and run lengths). Most applications will send the Application Blocks 11 in some order, as for instance, by columns top-down, but other applications may send just one-row blocks, and others may even force the blocks to be the whole image width wide. It is even conceivable that Raster Object data will be sent to the plotter in the reverse order it will be printed.

Figure 8:
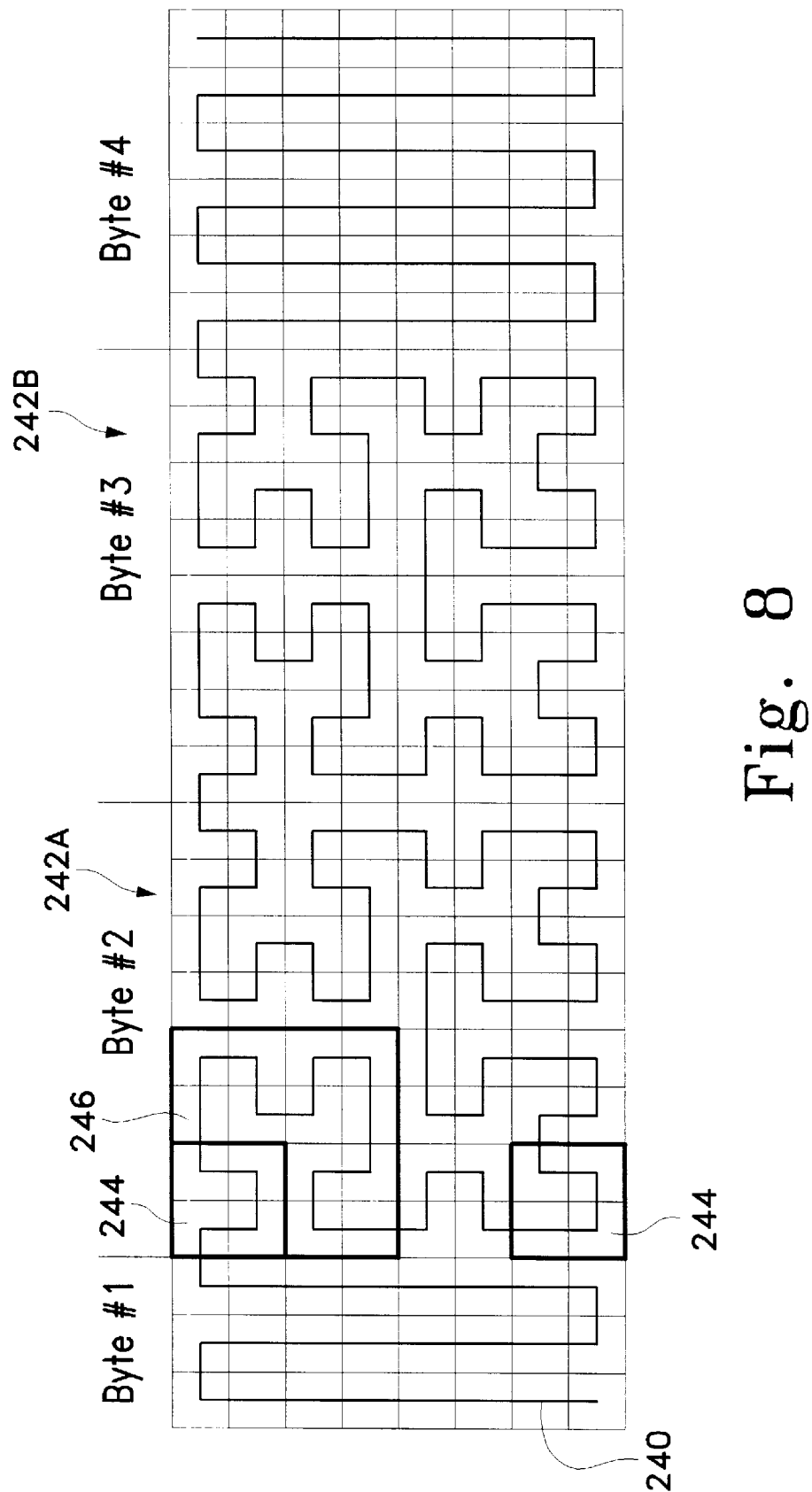
FIG. 8 shows a preferred peano-scan line through a single Raster Block.

Regardless of how the Raster Object data is received, as shown in FIG. 2 their individual rows of pixels are preferably packed into $2^n$-rows high Raster Blocks 9, with all the pixels in a particular Raster Block 9 belonging to the same application block 11 (driver block), and to the same output swath (a single Print Swath, or preferably a single Render Swath. An exemplary value for the parameter n is 3, which results in a convenient height of 8 rows, which as shown in FIG. 8 permits peano-scanning.

Assuming that a low memory condition is encountered by the Parser/Compress process 6, the uncompressed data structure in the Display List 5 is searched in order to find the Render Swath 10 that is taking up the most memory. Once this Swath is found, control passes to a Raster Object Compression routine (more fully described hereinafter with reference to FIGS. 5-6) which will free some memory. The Compression Agent decides whether this memory is enough for the requirements of the Memory Manager, if it is, then it will return control to the Memory Manager, otherwise it will locate the Swath 10 that is now taking up the most memory and carry on compressing. This selective compression process is continued until the low memory condition no longer exists, or until no more uncompressed Render Swaths 10 remain in the Display List 5.

Each pass of the Compression Agent process may be represented by the following pseudo-code:
  If a low memory condition is detected (cannot allocate any memory to store received but not yet stored Object)
  then
    if any stored Render Swaths are not compressed then
      find largest uncompressed swath compress all raster in that swath return TRUE
    else
      if received but not yet stored Object is a Raster Object that belongs to previously compressed and stored Swath
      then
        attempt to compress the current Raster Object and append it to the previously compressed Swath
        if entire current Raster Object is compressed and appended
        then return TRUE
        else return FALSE
      else return FALSE TRUE indicates that at least some memory has been released. If FALSE is returned, then no more Render Swath memory can be released without loss of data and it may be necessary to discard data before it is output, or to print the current swath in more than one pass.

If the page was organized into bands by the application program in the remote host and the bands are transmitted in the order they are to be printed (for example, using the HPGL/2 FR command), if the low memory condition happens when a band has already been rendered (Render/Uncompression Agent 7), memory may also be released by first "flushing" the portion of Display List memory 5 associated with that band, and only after all previous bands have been flushed will there be any need to compress a block associated with the band currently being received.

Compressing only data that has already been parsed and stored rather than compressing the data on the fly has many unobvious advantages that in many applications will outweigh the apparent processing inefficiencies and delays occasioned by multiple memory accesses to store, retrieve and re-store the same data. Selective compression has the advantage of permitting a more efficient selection of what data to compress when only a relatively small increase in memory capacity is required; however, compressing only data that has already been stored also increases the probability that sufficient space will be available to store the compressed data, since the compressed data will normally require less than the space already allocated to the same data in uncompressed form (in the unlikely event that an entire block of "compressed" data requires more space than the corresponding uncompressed data, it may remain uncompressed). Compressing only previously stored data also can actually facilitate efficient compression: Because the Super Block 13 (FIG. 3) with the most uncompressed raster data will be compressed first, there is a high probability that several Raster Blocks 9 of contiguous data from the same Render Swath 10 will be compressed as a single entity having similar compression statistics, even if they were received in random order together with other unrelated Application Blocks 11.

Figure 3:
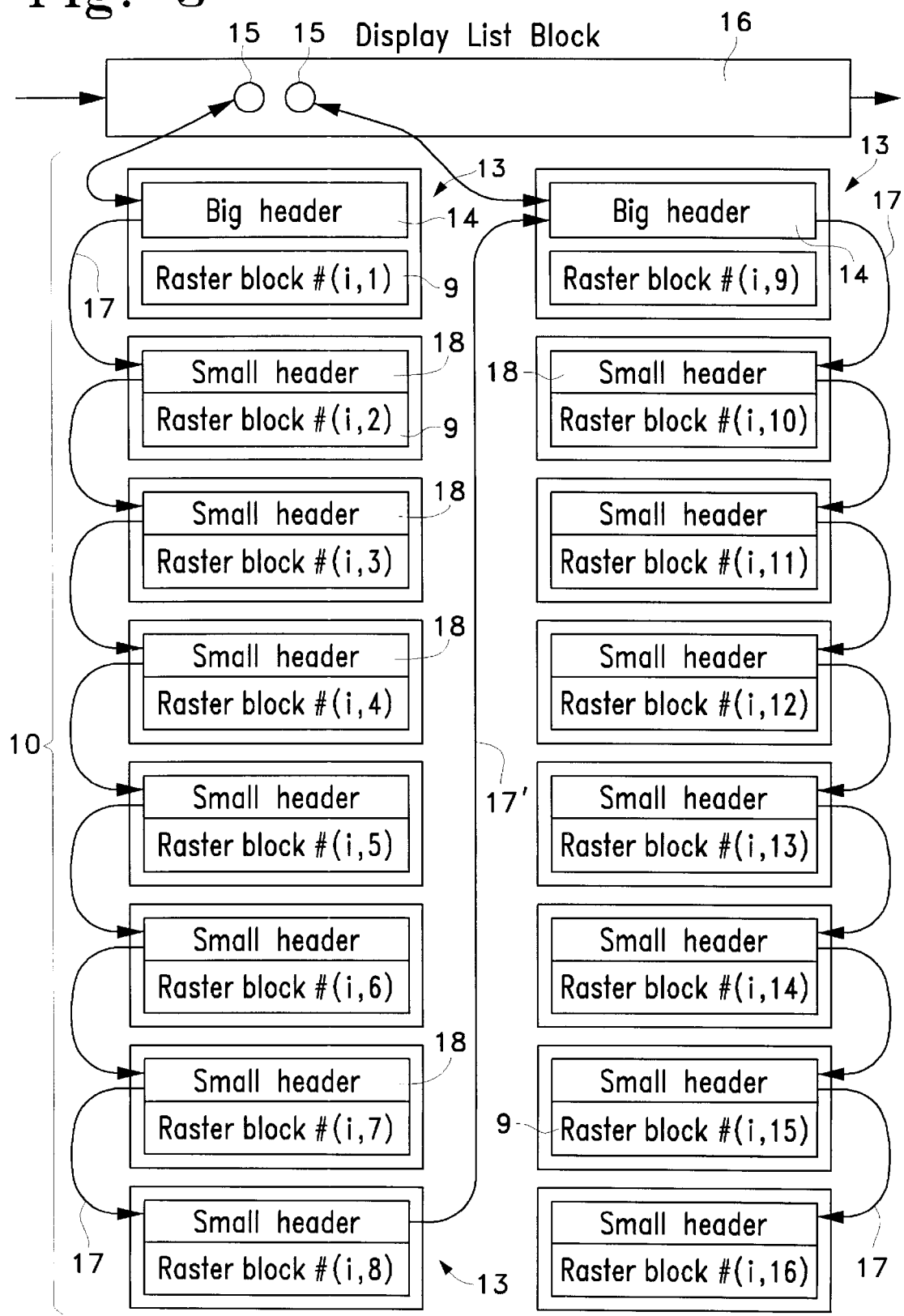
FIG. 3 shows the Raster Blocks of FIG. 2 of the same Render Swath stored and linked to a common Display List prior to compression.

As shown in FIG. 3, the uncompressed Raster Blocks 9 are preferably combined into one or more Super Blocks 13 each consisting of a series of Raster Blocks 9 within the same Render Swath 10 that have the same rendering attributes and width, as specified in common Super Block header 14. The number of rows of pixels in each raster block 9 of the same Super Block 13 is not necessarily the same, although a common size of 8 rows (which is a compromise between the housekeeping efficiencies and compression advantages of larger, fixed size blocks and the storage utilization flexibility of smaller or variable size blocks) is preferred for the sake of simplicity of implementation. Each Super Block 13 has a corresponding single entry 15 in the Display List Block 16 associated with that particular Render Swath 10, since the individual Raster Blocks 9 of that Super Block 13 will share common attributes and are contained in the same Render Swath 10 and are preferably compressed, rendered and/or deleted as a single entity. Each link between the Super Block headers 14 and the Display Link entries is bidirectional to allow the corresponding compressed blocks (FIG. 4) to be tied from the same starting point 15 in the Display List 16. However, in order to make better use of the available memory, it is desirable to use relatively small standard sized memory allocation units each corresponding to but a single Raster Block. Accordingly, the individual Raster Blocks 9 and Super Blocks 13 within the same Render Swath 10 are preferably linked by linked list pointers 17 to facilitate compression and deletion operations involving multiple Raster Blocks 9 and/or multiple Super Blocks 13, without repeated accessing of the Display List Block 16. The Display List Block 16 also has an associated Raster Compress flag that indicates whether the Raster Data 9,13 for that particular Swath 10 has been compressed or not.

Figure 4B:
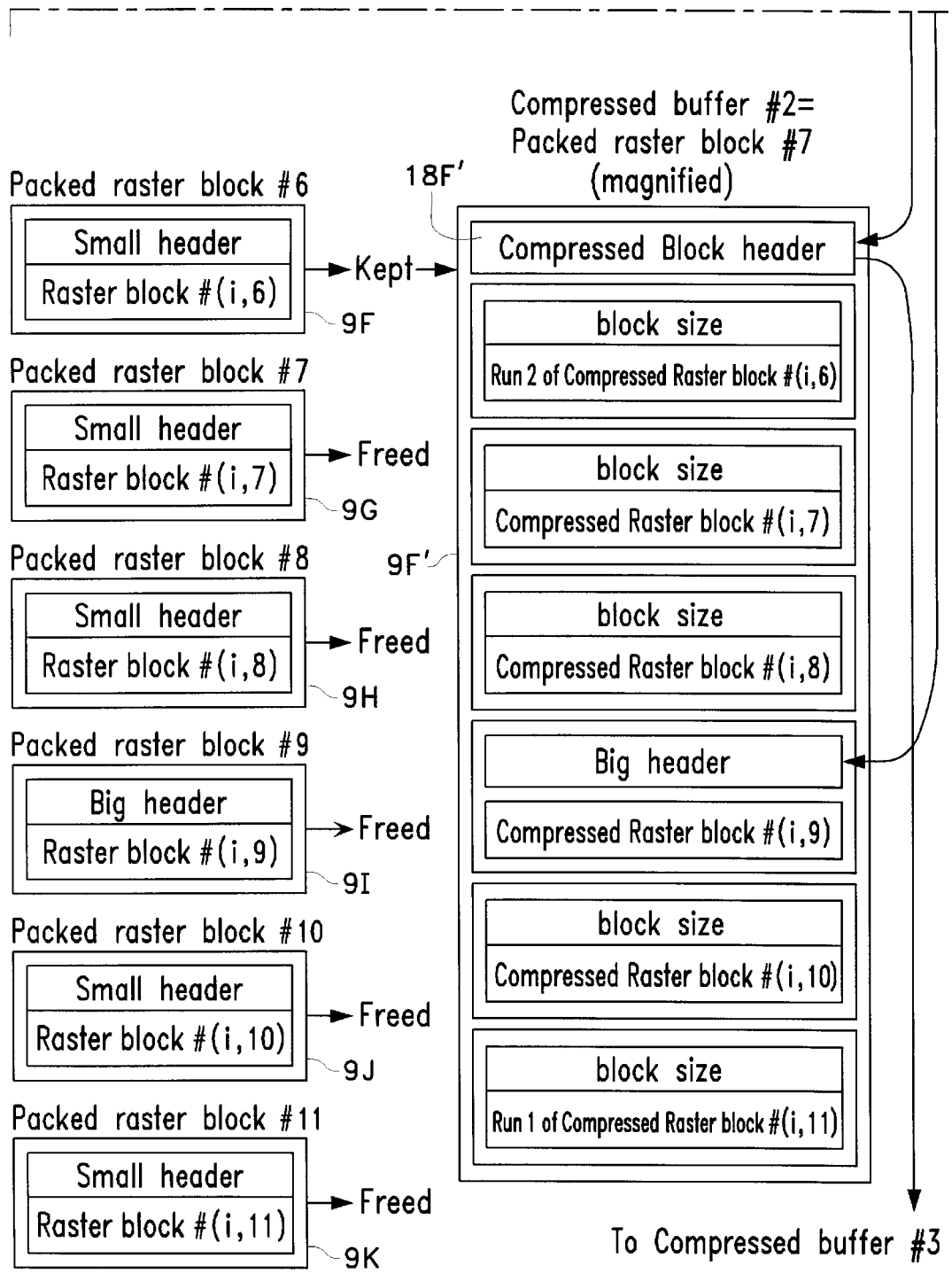
FIG. 4 shows the stored Raster Blocks of FIG. 3 after compression.

As best seen in FIG. 4, each Super Block 13 thus functions as a Raster Normal Object consisting of contiguous uncompressed (13A) or compressed (13B) Raster Data within the same Render Swath 10, and the associated Super Block Header 14A, 14B functions as a master Raster Record which includes information for both the current Raster Block 9A and for any subsequent Raster Blocks 9B–9K in that same Super Block 13. However, even though the basic Super Block structure is retained, as part of the compression process, the memory previously allocated to many of the uncompressed Raster Blocks 9 will be freed (for example, Raster Blocks 9B–9E & 9G–9K, their compressed contents then being incorporated within Compressed Blocks 9A' & 9F' of the compressed Super Block 13B. Note that the boundary between the individual Compressed Blocks 9A' & 9F' do not necessarily correspond to the boundary between the corresponding groups of Uncompressed Raster Blocks 9A–9E & 9F–9K, and that the contents of one Uncompressed Raster Block may be stored in compressed form as two runs 9F1 & 9F2 at the end of Compressed Block 9A' and the begging of Compressed Block 9F'.

Each Super Block header 14A, 14B Raster preferably includes:

A LastBlocks field for indicating whether the linked list forward pointer 17 points to a Raster Block 9 that belongs to another Super Block 13 and is used only for deleting, or whether it points to a continuation block for the current Super Block 13.

An ObjectRef field (uncompressed entries only) that points back to the Raster Normal Object entry 15 in the Display List 16, to facilitate the clearance of the pointer to that Raster Record and thereby facilitate the release of the memory allocated for the associated Raster Block once its data has been compressed and stored in another block.

A DataSize field (compressed entries only) that specifies the number of bytes (before compression) of the current Super Block 13 that are stored in this block. The compressor/uncompressor knows the total size of the uncompressed data for the current display list entry (RasterWidth times NumRows). As noted previously, if the compressed data does not fit into a single block, it will be split into several blocks, by using continuation blocks. If DataSize is smaller than the total raster size it means that the data continues.

A Compression field specifies the compression algorithm used. Note that dithered and non-dithered planes might have different compression algorithms. This compression field combines them both.

The X_coord field specifies the X coordinate of the left pixel of the raster block and of all consequent continuation blocks.

The RasterWidth field specifies the number of pixels for plane and for row.

The Y_coord field specifies the start Y coordinate (top) of the first raster block.

The NumRows field specifies the number of rows of the main raster block of an uncompressed block, such that any continuation block will start at Y_coord+NumRows. For a compressed block it specifies the total number of rows of the concatenated raster blocks compressed altogether. Note that a chain of raster blocks are compressed as a single unit which is then stored in a linked chain of one or more blocks each having the same size as one of the uncompressed blocks.

The StartfBit field specifies the first valid bit in the first byte of the raster data. If the raster is aligned to byte boundaries, the following condition should happen: low 3 bits of X_coord==StartfBit.

NumPlanes specifies the number of planes contained in the raster data, for every row. It ranges from 1 to 4. Either K (monochrome) or CMY (color), plus an optional W (white transparency) plane. Each Raster Object is formatted such that there are first all planes of first row, then all planes of second row, and so on.

NewRaster: It specifies whether it is a new raster with different attributes or it has the same attributes. A new raster forces the compression statistics to be regenerated, otherwise the statistics are reused for a better compression rate.

Halftone specifies what halftoning algorithm is applied to the image.

DitherPlanes specifies which of the planes have been dithered. A "1" in bit n means that the plane n has been dithered by the halftone algorithm. A "0" in bit n means that bit n has not been dithered (which will usually be the case for the white transparency plane).

A Raster Continuation block (Small Header 18) is used for both compressed and uncompressed Raster Data, and is required when the data for a single Raster Normal Object (e.g., Super Block 13 is stored in more than one Raster Block 9. It uses most of the parameters from the proceeding block's Big Header 14, with the following exceptions:
LastBlocks
DataSize
FIG. 5 shows:
A simple example of how Raster Data similar to that shown in FIGS. 3 and 4, but including Super Block 13C data crossing the boundary 12 between two successive swaths 10, is stored and linked to each respective Display List Block 16A, 16B.

All Raster Blocks 9B, 9, 9E in a particular swath are linked together as a linked list by means of deletion links 17 starting from the Queue Header 16A', 16B'. to allow for fast deletion.

Each SuperBlock 13A, 13B, 13C is bidirectionally linked to a pointer 15A, 15B, 15C, 15D in the Display List 16A', 16B', i.e., only one entry in the Display List per SuperBlock. These links are bidirectional to allow for compressed blocks whose data has been incorporated into other blocks to be linked to the original entry in the Display List (the same entry as was used to point to the original uncompressed block before it was deleted).

Within each SuperBlock 13, the Raster Blocks 9 are already linked together with the previously mentioned deletion pointer 17.

In the last Raster Block 9E at the end of a Swath 10 or at the end of a SuperBlock 13, the already packed raster data is stored in a smaller block of memory than required for a full sized uncompressed Raster Block, so as not to waste memory space.

A new Raster Block 9B is allocated for raster Data at the beginning of each Swath 10 and at the beginning of each SuperBlock 13.

The presently preferred dither matrix compression scheme will now be described with reference to the diagrams and flowcharts of FIGS. 6–8.

Most regular images (faces, landscapes, buildings, etc.) have a dominant low-pass component. A dithering matrix in effect quantizes the image (leaving the low-pass component intact) and adds randomly distributed noise to the quantized image. Low frequencies mean mainly flat areas. Intuitively this is also a helpful hint to see where an image will potentially have a good compression ratio, since when a flat region a dominant low frequency is scanned, the result is an almost flat signal which is relatively easy to compress.

Applying a dither matrix to a continuous tone image has the perceptual effects of a low-pass filter. A low-pass filter removes the energy of a signal lying outside the low frequency region by removing sharp edges and high-frequency/low-amplitude noise, even though the real frequential characteristic of the dithering matrix is a very high frequency noise-like pattern, very difficult to compress by the traditional compression schemes. As mentioned above, the image to be printed is going to be halftoned using matrix dithering techniques. This introduces a perceptual low-pass filter effect, and also introduces a high-frequency noise-like pattern to simulate the different colors which interferes with conventional compression methodology. However, in accordance with one aspect of the present invention, the dither matrix can itself be used to recover a quantized pseudo-version of the original image.

The power of this method is two-fold, on one hand you are able to remove the high frequencies introduced by the matrix itself, and on the other it recovers a quantized version of the image, in which all the low amplitude high frequencies have been clipped away. With this you can achieve very long runs of the same quantizing value in the pseudo-image following a predetermined scan path. Once you have a run, the only thing you need is a thresholding value which allows you to recover the already dithered values using the matrix, again for dithering.

Figure 6:
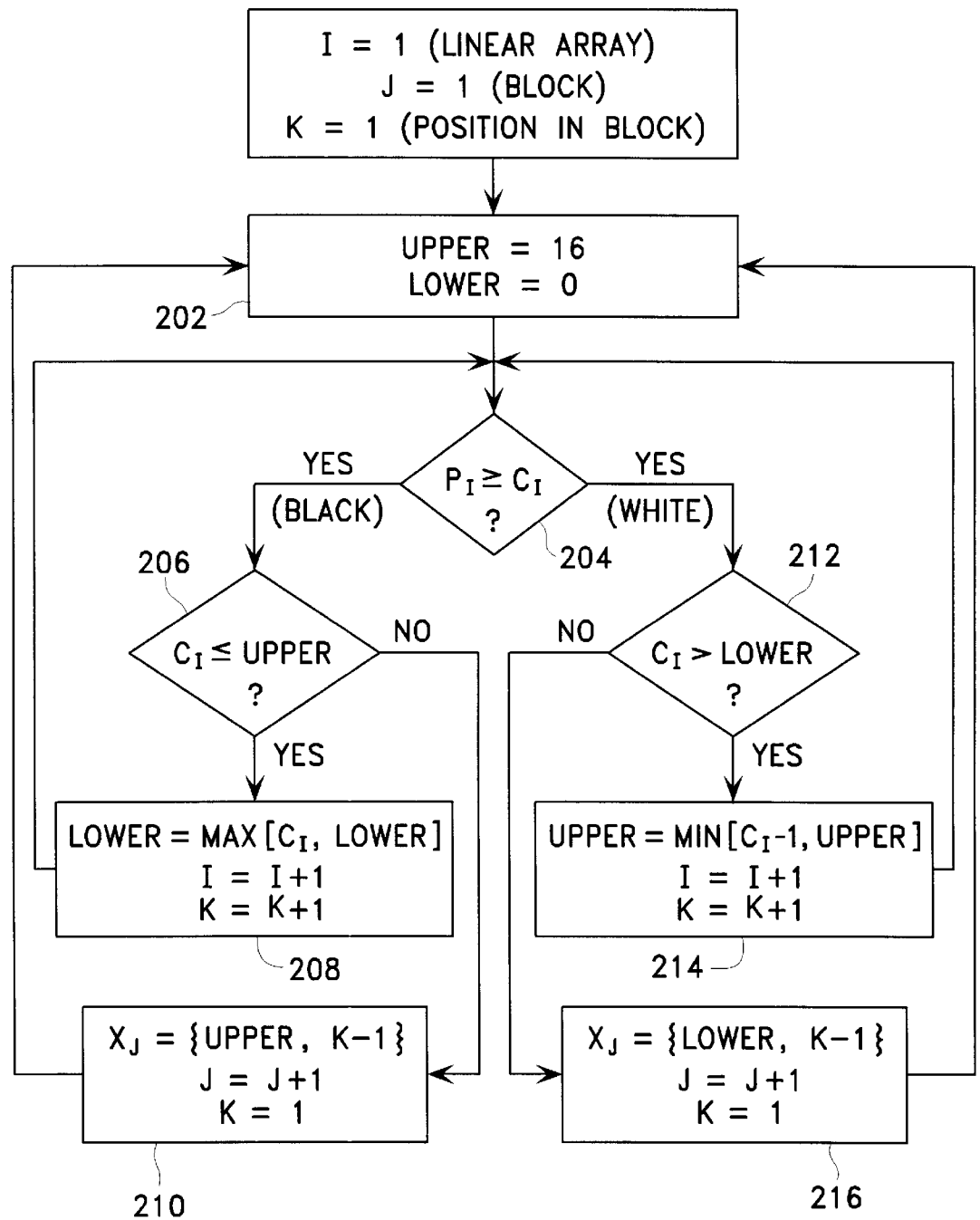
FIG. 6 is a flow diagram of a lossless dither-matrix compression method.

More particularly, as shown in the Flow chart of FIG. 6, if the intensity of a pixel $P_I$ is greater than the value of the corresponding cell $C_I$ of the dither matrix (Yes branch from block 204), the corresponding pixel of the dithered image is black, and may be represented by a pixel having any intensity greater than the threshold value of that cell, which establishes a lower limit LOWER for the possible intensity of that block; similarly, a white pixel in the dithered image of that same block (No branch from block 204), establishes an upper block intensity limit UPPER. If the next pixel in the block has a black dithered image and the corresponding threshold $C_I$ is less than any previously established maximum intensity UPPER (block 206), the previous minimum intensity LOWER is replaced by the greater of the old minimum intensity LOWER or the corresponding threshold value $C_I$ (block 208). Similarly, if the next pixel in the block has a white dithered image and the corresponding threshold $C_I$ is greater than any previously established minimum intensity LOWER (block 212), the previous maximum intensity UPPER is replaced by the lesser of the old maximum intensity UPPER or the corresponding threshold value $C_I$ (block 214). The process is repeated for successive pixels, until a pixel is located which would cause the most recent value of the lower block intensity limit LOWER to exceed the most recent value of the upper block intensity limit UPPER (No branches from blocks 206, 212), whereupon that pixel becomes the first pixel in a new block (blocks 210, 216) and the two limits UPPER and LOWER are reset to their starting values (block 202). Each block of pixels may $X_I$ thus be represented by a single intensity value (blocks 210, 216) between the most recent LOWER and UPPER limits established for that block and by the number of pixels (K-1) in that block, because the size and intensity of each block was preferably determined such that it will correspond exactly to the corresponding block of the dithered image after it has been processed with the dither matrix, the result is a lossless compression scheme for that dithered image.

Although the principles underlying the use of dither-matrix to compress a dithered (or about to be dithered) image are best understood in terms of blocks of adjacent pixels which may each be coded as a run length K-1 and an intensity value (UPPER; LOWER), an even more efficient (albeit more computationally complex) representation of the compressed image can be obtained if the dither matrix is used not only to generate the equivalent image, but also to encode it. The value of the dithering matrix corresponding to the current pixel location on the scan line is tested to determine if it can be used to halftone all the not-yet encoded previous pixels on that scanline. The process is repeated until an out-of-bounds value is reached, in which case the last valid candidate determines both the intensity and the run length.

Figure 7:
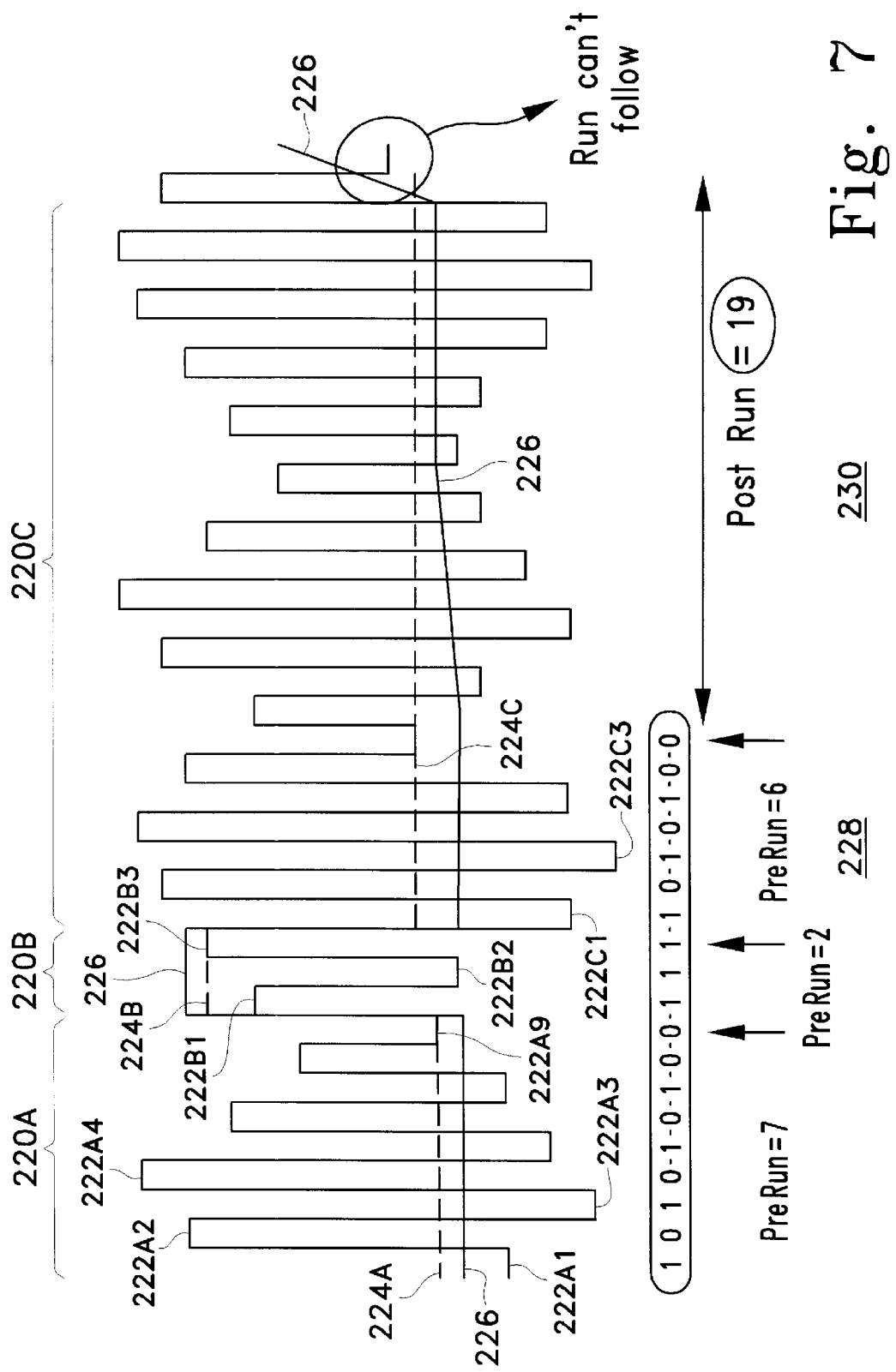
FIG. 7 is a symbolic diagram of an improved dither matrix compression derived from the method of FIG. 6

In particular, as shown by the left hand portion of FIG. 7, each block is associated with a sequence of threshold values of the dither matrix and a constant intensity value 220, A B C; 222 A1, A2, A3; 222 B1, B2, B3; 224 A B C for the portion of the corresponding quantized image defined by that block. Since the intensify of each block 220 of the equivalent image 224 is constant and when compared with the individual threshold values, produces the same dithered image as the corresponding portion of the original (unquantized) image 226, the encoded intensity will always be bounded by at least one threshold (either an upper threshold or a lower threshold) which is equal to a value of the dither matrix corresponding to one of the pixels within that block. Accordingly, once the upper and lower threshold have converged onto a constant intensity block of maximum size, it is possible to truncate that block at a pixel associated with a threshold that could be used as the encoded intensity value for the entire block. Thus, rather than using one byte to encode one of 256 possible intensities (assuming a dither matrix having a preferred dimension of 16 rows and 16 columns) and a second byte to encode one of 256 possible run lengths, the first seven bits of a single byte may be used to represent a run length of up to 128 pixels having an intensity equal to the threshold associated with the last pixel of the truncated run, with the eighth bit being used to represent whether the selected threshold is an upper threshold or a lower threshold (i.e., whether the last pixel in the corresponding block of the dithered image is a white pixel or a black pixel. However, computational efficiency is enhanced if the untruncated constant intensity block is encoded as a "PreRun" value corresponding to the number of pixels between the start of the run and the pixel corresponding to the selected threshold and a "PostRun" value corresponding to the number of pixels between that pixel and the end of the run, thereby avoiding the need to reprocess those pixels at the end of the block as possible candidates for the PreRun portion of the next encoded block.

Especially when long run lengths are anticipated (for example, in images having large "flat" colored areas), even better compression is possible by providing for the efficient encoding of run lengths greater than can be represented by a single byte. To that end, as shown in the right hand portion of FIG. 7, the single "PreRun" byte (or perhaps even more than one PreRun byte, if the threshold in question is not found in the first 128 or so pixels of the run) is preferably supplemented by one or more "PostRun" bytes.

For example, If the number of PreRun pixels 228 is greater than 126, the first PreRun byte (which would normally be a count between 1–126) is replaced with a code of $(127)_{10}$ to indicate that the PreRun pixel count has been truncated to 126 and that one or more supplemental PreRun bytes follow. If the number of pixels remaining after truncation is between 1 and 254, then that remainder is written into the second PreRun byte (which is then last PreRun byte). Otherwise, a code of $(255)_{10}$ indicates that multiplicative factor is next to represent, followed by a remainder. For example, a PreRun code of (127),(255),(003),(120) signifies a total PreRun length of 126+(3*254)+120.

PostRun lengths 230 may be similarly encoded, with appropriate provisions for the fact that the PostRun may actually be zero and there is no need to reserve an eighth bit to represent "above" or "below").

Entropy coding is a data compression technique which is takes into account any nonuniform statistical distribution of the data. For instance, if a code appears very often, you want to code it using fewer bits than the less probable codes, which may be encoded with longer codes. When processing complex images, relatively short PreRuns with PostRun lengths 230 of zero are quite common, and it may be efficient to reserve yet another bit of the first PreRun byte to indicate a PostRun length of 0 (which is thereby encoded as a single bit, rather than a whole byte, albeit at the expense of having only six bits in the first PreRun byte for run length, which will result in more 2-byte PreRuns.

This algorithm is done in the code by the functions

BoundAndCompress( ) which determines whether the matrix value corresponding to the pixel being inspected is going to fit in the PreRun/PostRun, or whether it Is a thresholding value, which will mean the PreRun and PostRun need to be encoded.

BoundAndCompressEOB( ) which determines the same as above, but it is only called at the EndOfBlock, in order to improve for speed in the main function above.

In accordance with another aspect of the present invention, it is desirable to take advantage of the locality of the low frequency regions associated with regular images such as faces, landscapes, buildings, etc., which have a dominant low frequency content, by processing each flat area is processed as a unit to take advantage of the locality of that low frequency content, especially when most of the meaningful high frequency content has been removed by the dithering process. In a particularly simple embodiment, each Raster Block is 8 pixels high is scanned in a zig-zag line: even columns are scanned top-down, and odd ones are scanned bottom up.

A much better way to scan an image in order to remove the locality redundancy is the peano scan 240 shown in FIG. 8, which results in a fractal path which scans in the same way at any resolution and for any size area. This could actually be used in a multi resolution approach, if needed. Each depicted cell 242 A, B, has 8×8 pixels, but the process is applicable to 16×16 and bigger cells. Each group of 4 pixels 244 that is scanned is formed by the square forming pixels in that particular location. From a coarser resolution (i.e., half and half) that would be just one pixel. Note now the first 16 scanned pixels 246, they would be one pixel at the following coarser resolution (i.e., quarter and quarter), and so on. Because of this, this scan path is optimal when dealing with pixel replication algorithms for upscaling.

Yet another aspect of the invention will now be discussed with reference to FIGS. 9A & 9B, which respectively show a typical distribution of the encoded PreRun and PostRun data for 40 successive swaths of a typical dithered image after it has been processed by the above-described dither-matrix based compression methodology.

Figure 9A:
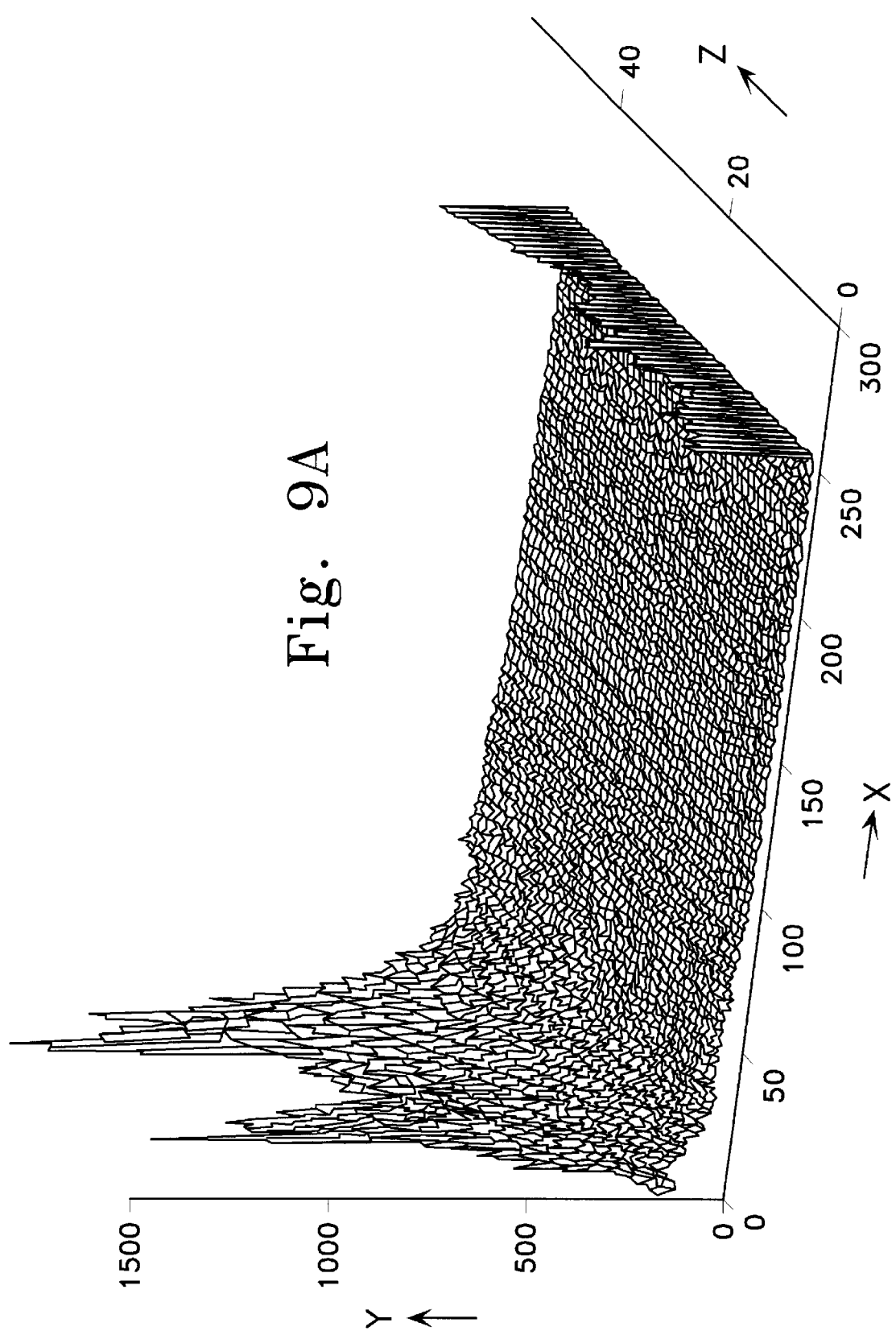

In particular, referring to FIG. 9A, it will be seen that the distribution (x-axis) of PreRun codes (000) through (253) is essentially an exponential decay. Golomb-Rice encoding is a known encoding method which utilizes variable length codes and assigns codes having the shortest lengths to the most frequently encountered data values. It is therefore optimal for a known exponentially decaying statistical distribution. In practice, the distribution statistics of the applicable run lengths will not be the same for all parts of an image, and the frequencies of the individual data values will change. Accordingly, the encoder maintains a running average of the previously processed data values, and uses this average to determine the optimal coefficient to be used to encode the current data value. Since the data is represented in binary notation and n is typically represented in the form $n=n_{(mod\ m)}+[n/m]$, where "$n_{(mod\ m)}$" is a binary number and "[n/m]" is a unary code, the Golomb-Rice compression coefficient m is preferably of the form $2^k$ for ease of computation, resulting in a very fast and efficient compression. Since optimal performance is achieved when the distribution is exponential, a table is maintained by the encoder of each possible value and the number of times it has already been encountered in the raster data (typically a Super Block 13) currently being compressed, and the individual entries are reordered after each iteration so that in subsequent processing, the shorter codes will be assigned to the more frequently encountered data values. Since the decoder has already decoded the prior data used by the encoder to establish the compression coefficient k and to maintain that prior data in the desired monotonically descending order, the required ordering is already implicit in the received encoded data. Again, the required processing is very simple and fast, and the resultant compression is very efficient.

Referring now to FIG. 9B, it will be seen that the PostRun codes are similarly distributed in an exponentially decaying manner, albeit with a steeper rate of decay and with a higher incidence of the special codes (254 and 255) signifying extended run lengths. Although optimum compression would be achieved by treating PostRun data as a separate context with separate compression statistics (coefficients and ordering), in practice the benefit to be achieved is slight and the additional computational complexity is not normally justified.

The described encoding of the PreRun and PostRun data thus takes into account the actual statistical distribution of the input symbols, and depending on that it assigns longer or shorter codes to them, in a manner which is especially fast and efficient for the type of data that results after the high frequency dither-matrix noise has been removed. The functions EntropyCode( ) and Process-Runo( ) are responsible for the encoding part of the Golomb-Rice. These functions are called each time a PreRun or a PostRun symbol has been generated.

Those skilled in the art will realize that conventional image description languages such as Hewlett Packard's RTL (Raster Transfer Language) and HP-GL/2 (used for vectors, lines, areas, and font-defined characters) are object and page oriented, not swath oriented, and that the best print quality is obtained when an optimum traverse speed is maintained and there is only a minimal delay between successive swaths. Moreover, optimal print quality frequently requires multiple pass printing with a paper advance between successive swaths that is only a fraction of the height of one print swath; when printing in landscape mode, the individual swaths are typically oriented not horizontally but vertically. Accordingly, in a currently contemplated preferred embodiment, the data is not necessarily received in exactly the order in which it will be printed, and provision is therefor made for all the raster image data for a given page to have been received, stored, and if necessary compressed, before even the first band of pixels for the first swath on that page has been rendered and is ready for printing. It will be appreciated that such a preferred embodiment requires sufficient display list memory be available to store an entire page of unrendered Raster Objects and other image data.

The invention is independent of other appropriate measures that may be used to minimize the memory required to support the subsequent "rendering" and "printing" of each "print swath" of a larger image. For example, the "rendering" process may include uncompressing the raster data, expanding any text or vector data to be included in the printed image, combining the expanded text and vector data with the uncompressed raster data, and (if the image is a full color image) translating three planes of image data (typically red, green and blue) into a separate plane of print data for each type of ink actually used in a particular color printing process (typically yellow, cyan, magenta and black) to form a band of pixels to be printed, and the actual "printing" process may include retrieving successive columns from the previously rendered band of pixels as the printhead of an inkjet printer traverses across the print medium. The rendered image data may be again compressed (possibly using a faster but less efficient compression algorithm than was used to selectively compress the unrendered raster data) before it is accessed for printing and/or the rendering may be pipelined with the printing, so that only a few columns of uncompressed and rendered data need be stored. Alternatively, since the printing in an inkjet printer is typically organized as multiple swaths on the same page, the image raster data for each swath can be rendered and printed and the applicable memory released before any image data needed only for subsequent swaths is received and processed, or the carriage can slowed down or stopped if image data can not be rendered in real time at a rate corresponding to the preferred traverse rate of the carriage.

The previously described compressed block structure with links from the Display List header of a single Render Swath, and with the compressed blocks inside standard size blocks is a very compact way to keep compressed raster data in memory; otherwise all that is gained in compression might be lost due to fragmentation.

What is claimed is:

1. A method of storing and processing halftoned raster data, comprising the steps:
   using a predefined dither matrix having predetermined dithering thresholds to render raster data into individual pixels of an uncompressed halftoned digital image;
   storing said uncompressed halftoned digital image in a local memory;
   using the predetermined dithering thresholds to losslessly compress a selected two-dimensional portion of the stored uncompressed halftoned image; and
   replacing said stored uncompressed halftoned image portion in said local memory with a corresponding compressed halftoned image portion.

2. The method of claim 1, wherein the raster data is organized as a plurality of 2-dimensional Raster Blocks.

3. The method of claim 1, wherein at least some of the uncompressed raster data is compressed "on the fly" before it is stored.

4. The method of claim 1, wherein at least some of the uncompressed raster data is initially stored in the memory in uncompressed form and is subsequently compressed only when additional memory is required, thereby enhancing throughput when not all of the raster data must be compressed.

5. The method of claim 4, wherein the raster data is compressed one block at a time, until the available memory is at least sufficient to store all the image data required to render at least a single "swath", and preferably an entire page.

6. The method of claim 4, wherein prior to compression and rendering, the raster data are stored in a Display List as Raster Objects having a size and structure that facilitates subsequent compression and retrieval.

7. The method of claim 4, wherein the Raster Objects are blocks having a height of 2N, where N is an integer greater than 2.

8. The method of claim 4, wherein at least some of the memory becomes available for storing other Raster Objects when a previously stored Raster Object is compressed.

9. The method of claim 8, wherein the memory is released incrementally after each swath has been printed.

10. The method of claim 8, wherein at least some of the raster data for a subsequent page is downloaded even before a current page has been completely rendered and printed.

11. The method of claim 8, wherein
    both compressed and uncompressed raster data is stored in the same size blocks with pointers both to and from a linked list of Raster Objects, and
    any no longer required memory is re-utilized without fragmentation as soon as a block of the stored uncompressed raster data has compressed.

12. The method of claim 4, wherein
    the Raster Objects are divided at Render Swath boundaries prior to compression, and
    as soon as a particular Render Swath has been rendered all the memory space required for storing the associated Raster Object data for that particular Render Swath can be released.

13. The method of claim 4, wherein all the Raster Objects in the same Render Swath are stored in compressed form in one or more of the same blocks which were originally used to store those particular Raster Objects in uncompressed form and which thereafter function as container blocks for the compressed data.

14. The method of claim 13, wherein
    two or more container blocks storing several compressed Raster Objects in the same Render Swath are linked to facilitate the release of those container blocks once the data has been rendered, and
    those compressed Raster Objects are linked to facilitate retrieval and uncompression of the individual Raster Objects during the rendering process.

15. The method of claim 13, wherein only some of the original blocks are utilized as container blocks and the remaining blocks are released as soon as the data is compressed.

16. The method of claim 4, wherein the compressed Raster Object data used in rendering a particular Render Swath are saved for use in rendering another Render Swath.

17. The method of claim 1, wherein the losslessly compressing step includes tracing a contiguous two-dimensional path through the raster data being compressed, thereby responding to spatial correlations between adjacent rows as well as between adjacent pixels in the same row.

18. The method of claim 1, wherein the halftoned image includes both dithered continuous tone components derived from Raster Data and monotone text or line art components derived from Text and Vector Data.

19. The method of claim 1, wherein at least one Vector Object or Text Object is stored in symbolic fashion and is combined in whole or in part with the halftoned raster data in a particular print swath during a rendering process.

20. The method of claim 1, wherein the dither-matrix based compression of the raster data is followed by Golomb Rice compression.

21. The method of claim 1, wherein the pixels of the uncompressed image are encoded as blocks each having an associated run length and an associated level function, such that when those encoded blocks are assembled into a replica of the original image and both the original image and the replica image are dithered with the same predetermined dither matrix, the dithered replica image is identical to the dithered original image.

22. The method of claim 21, wherein the level function is a constant value function and the blocks are constant intensity blocks.

23. The method of claim 21, wherein the level is encoded indirectly by pointing to the cell of the predetermined dither matrix containing the threshold corresponding to the constant level with which that block is to be encoded.

24. The method of claim 21, wherein the pixels in a particular block of the original image associated with respective dither matrix thresholds greater than the encoded value for that block will correspond to white pixels in the two dithered images (original and replica) and the pixels of that block having respective dither matrix threshold values less than the encoded value will correspond to black pixels in the two dithered images.

25. The method of claim 21, wherein a Pre Run portion of the block is truncated at a pixel whose dither matrix threshold corresponds to the level function in question.

26. The method of claim 25, wherein Post Run data is appended to the truncated Pre Run data.

27. The method of claim 21, wherein the run length is encoded as a variable length field.

28. The method of claim 21, wherein at least longer blocks are encoded as two independent variables (level and run length).

29. The method of claim 1, wherein the image is subsequently printed by an inkjet printer having multiple printheads each capable of printing 512 dots along a print swath that is at least 36 inches wide.

* * * * *